(12) United States Patent
Qiu et al.

(10) Patent No.: US 6,728,362 B1
(45) Date of Patent: *Apr. 27, 2004

(54) CONTINUITY TESTING WITH CALL TONE MESSAGING IN COMMUNICATION NETWORKS

(75) Inventors: Chaoxin Charles Qiu, Olathe, KS (US); Shannon P. Silvus, Penfield, NY (US); Richard N. Kennedy, Naperville, IL (US); Michael J. Gettles, Olathe, KS (US); William Douskalis, Centreville, VA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/537,054

(22) Filed: Mar. 28, 2000

(51) Int. Cl.[7] .................................. H04M 3/00
(52) U.S. Cl. .................... 379/242; 379/88.17; 379/229; 370/385; 370/467
(58) Field of Search .................... 379/242, 213.01, 379/220.01, 229, 88.17; 370/385, 467

(56) References Cited

U.S. PATENT DOCUMENTS 5,438,570 A    8/1995  Karras et al.
6,023,474 A  * 2/2000  Gardner et al. ............. 370/467
6,333,931 B1 * 12/2001 LaPier et al. ................ 370/385

FOREIGN PATENT DOCUMENTS

WO    WO 98/23053    5/1998
WO    WO 99/28827    6/1999

OTHER PUBLICATIONS

Bandow, "Die Continuity Check–Prozedur," Zeichengabesysteme LTU Vertriebsgesellschaft MBH, 1995, pp. 149–150, XP–002214715.

* cited by examiner

Primary Examiner—William J. Deane, Jr.

(57) ABSTRACT

A communication hub for providing continuity testing and call tones in communication networks. The communication hub comprises a processor coupled to an interface and a tone generator. The processor is configured to process an in-band call tone request message to generate a continuity acknowledgment message and to direct the tone generator to provide call tones to a call device. The tone generator is configured to generate the call tones for the processor. The interface is configured to receive the call tone request message and transmit the continuity acknowledgment message and the call tones for the processor.

42 Claims, 12 Drawing Sheets

CONTINUITY TESTING WITH CALL TONE MESSAGING IN COMMUNICATION NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication networks, and specifically, to a method and system for providing continuity testing and call tones in a communication network.

2. Description of the Prior Art

The development of advanced communication networks has taken on critical importance with the dramatic rise in consumer demand for: higher quality services. Continuity testing in communication networks is one method of ensuring the quality of services. A continuity test ensures bearer channel connectivity prior to call completion. The continuity test is generally performed on a pre-determined percentage, of calls to verify bearer channel connectivity between a pair of switches.

FIG. 1 illustrates an example of a continuity test in a public switched telephone network (PSTN) using signaling system 7 (SS7). On FIG. 1 the calling party removes the receiver from the calling party's telephone 100. The originating switch 101 detects the off-hook and provides a dial tone to telephone 100. Responsive to receiving the dial tone, the user enters the digits for a call destination. The originating switch 101 processes the entered digits and provides an initial address message (LAM) to the network 102. The IAM message includes a continuity test flag that indicates to the network 102 that a continuity test will be performed on the bearer channel between the network 102 and the originating switch 101. The originating switch 101 then sends a test tone over the bearer channel to the network 102. Responsive to sending the test tone, the originating switch 101 starts a timer. The network 102 loops the test tone back to the originating switch 101. If the test tone is received back in the originating switch 101 before the timer times-out, the continuity test is successful and the originating switch 101 sends a continuity message to the network 102. The continuity message confirms the continuity test is complete and successful. If the test tone is not received back in the originating switch 101 before the timer times-out, the continuity test is failed and the call is cleared Responsive to a successful continuity test, the network 102 provides an IAM message to the terminating switch 103 and reserves a call connection between the originating switch 101 and the terminating switch 103. The terminating switch 103 sends an address complete message (ACM) to the network 102 and the call is completed between telephones 100 and 104 in the conventional fashion.

Call tones are generated in communication networks to provide callers with feedback regarding the status of calls and call connections. Examples of specific call tones include a ringback tone, a busy signal tone, and a reorder tone. The reorder tone is sometimes referred to as a fast busy signal in the art. Typically, call tones are provided in communication networks by a terminating communication device upon completion of the call connection. In some applications however, call tones can be provided by an originating communication device by triggering the call tone generation using a control or signaling channel.

FIG. 1 illustrates an example of call tone control and generation for a call session in the PSTN 102. On FIG. 1 the calling party removes the receiver from the calling party's telephone 100. The originating switch 101 detects the off-hook and provides a dial tone to the calling party's telephone 100. Responsive to receiving the dial tone, the user enters the digits for a call destination. The originating switch 101 processes the entered digits and provides a call setup message to the network 102. The network 102 provides the call setup message to the terminating switch 103 and reserves a connection between the originating switch 101 and the terminating switch 103. In response to receiving the call setup message, the terminating switch 103 provides an acknowledgment message to the network 102. If the terminating switch 103 detects the called party's telephone 104 is off-hook or busy, the terminating switch 103 provides busy signal tones over the network 102 to the calling pasty's telephone 100. If the terminating switch 103 does not detect that the called party's telephone 104 is off-hook or busy, the terminating switch 103 provides ringback tones over the network 102 to the calling party's telephone 100. The terminating switch 103 also rings the called party's telephone 104 to announce the incoming call.

FIG. 2 illustrates another example of call tone generation and control for a call session in a packet communication network. On FIG. 2 the calling party removes the receiver from the calling party's telephone 200. The originating communication hub 201 detects the off-hook event and provides an off-hook message to the network 202. Responsive to receiving the off-hook message, the network 202 provides a dial tone to the calling party's telephone 200 via the originating communication hub 201. Responsive to receiving the dial tone the user enters the digits for the call destination. The originating communication hub 201 detects the digits and provides the digits to the network 202. The network 202 processes the digits and generates a setup message for a terminating communication hub 203 connected to the called party's telephone 204. Responsive to receiving the setup message, the terminating communication hub 203 provides a setup acknowledgment message to the network 202. If the called party's telephone 204 is off-hook or busy, the terminating communication hub 203 provides busy signal tones over the network 202 and communication hub 201 to the calling party's telephone 200. If the terminating communication hub 203 does not detect the called party's telephone 203 is off-hook or busy, the terminating communication hub 203 provides ringback tones over the network 202 and communication hub 201 to the calling party's telephone 200. The terminating communication hub 203 also rings the called party's telephone 204 to announce the incoming, call.

It is a problem in communication networks to provide call tones over the network from the terminating device. New services such as call waiting, call forwarding, and three-way-calling have increased network resource demands. Therefore, a need exists in the art to free network resources currently utilized by call tone generation and control in communication networks. It is also a problem to provide continuity testing in packet networks. Unfortunately, packet-networks do not effectively support continuity testing.

SUMMARY OF THE INVENTION

The present invention advances the art by providing a communication hub that provides call tones in communication networks at points proximate the calling device and performs continuity testing to ensure bearer path connectivity prior to call completion. Some examples of call tones that could be provided include without limitation, ringback tones, busy signal tones, and reorder tones. Advantageously, in some examples of the invention, the communication hub combines call tone generation and control with continuity testing in the network and utilizes the call tone messaging to perform the continuity test. Advantageously, network resources required for call completion are reduced because call tones are provided at points proximate the calling device and a separate continuity test of the bearer channel is unnecessary. Also advantageously, service assurance is provided before call completion and early detection of network failures is realized.

The communication hub is comprised of a processor, an interface, and a tone generator. The tone generator is configured to generate the call tones under control of the processor. The processor is configured to process an in-band call tone request message that includes a request to provide call tones to a call device connected to the communication hub. The processor is further configured to generate a continuity acknowledgment message in response to the call tone request message and direct the tone generator to provide call tones to the call device. The interface is configured to receive the call tone request message and transmit the continuity acknowledgment message and the call tones.

In the context of the present invention the first, second, third, fourth, etc. connotations used to reference the messages, the calls, and the devices are used for the purpose of differentiating between different messages, different calls, and different devices and are not used to indicate a message sequence, call sequence or processing sequence. Also in the context of the present invention, an on-network call session is defined as a call session between two devices connected to the same communication network. An off-network to on-network call session and an on-network to off-network call session are defined as an incoming call session and an outgoing call session, respectively, between two devices connected to different communication networks, e.g., an incoming call session or an outgoing call session between a call device, connected to a packet network and a call device connected to the PSTN. In-band is defined as using the bearer portion of a communication path, for example, in an asynchronous transfer mode network over the bearer channel. Those skilled in the art will appreciate that in some environments, such as an Internet Protocol (IP) environment, in-band could be an address of an originating device and terminating device.

DETAILED DESCRIPTION OF, THE PREFERRED EMBODIMENT

Figure 3:
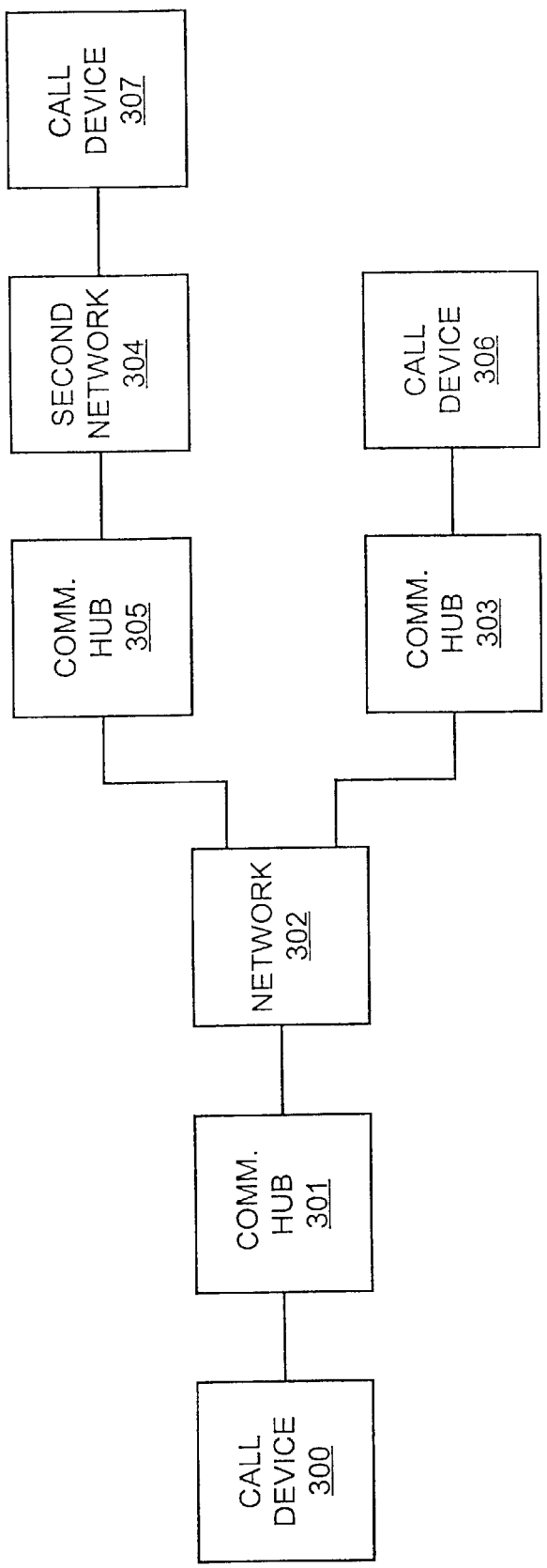
FIG. 3 illustrates an example of a network architecture according to the present invention.

FIG. 3 illustrates a network architecture according to the present invention FIG. 3 depicts call devices 300, 306, and 307, communication hubs 301, 303, and 305, communication network 302 and second communication network 304. Communication hub 301 is connected to call device 300 and communication network 302. Communication network 302 is connected to communication hubs 303 and 305. Second communication network 304 is connected to communication hub 305 and call device 307. Communication hub 303 is connected to call device 306.

Call devices 300, 306, and 307 could be conventional call devices that use digital and analog telephony format. Some examples of call devices 300, 306, and 307 are devices configured to provide voice, data, and video communications. Communication network 302 and second communication network 304 could be different communication networks. In some examples of the present invention, communication network 302 is a packet network and second communication network 304 could be any other network including without limitation, a wireless network, a packet network, an internet, or the PSTN. Those skilled in the art will appreciate the communication networks 302 and 304 would include various conventional components not shown on FIG. 3 for clarity.

Communication hub 301, could be any communication device capable of: 1) receiving an in-band call tone request message that includes a request to provide call tones to call device 300, 2) generating and transmitting a continuity acknowledgment message, and 3) providing the call tones to call device 300. Some examples of communication hub 301 include without limitation, a switch, a private branch exchange (PBX), and a residential communication hub.

Communication hub 305 could be any communication device capable of interfacing between communication network 302 and second communication network 304. Communication hub 305 could: 1) receive an in-band call tone request message that includes a request to provide call tones to one of call devices 300 and 307, 2) generate and transmit a continuity acknowledgment message, and 3) provide the call tones to one of call devices 300 and 307. Some examples of communication hub 305 include without limitation, a network device such as a voice gateway and a switch.

Communication hub 303, could be any communication device capable of: 1) receiving an in-band call tone request message that includes a request to provide call tones to call device 306, 2) generating and transmitting a continuity acknowledgment message, and 3) providing the call tones to call device 306. Some examples of communication hub 301 include without limitation, a switch, a PBX, and a residential communication hub.

The Communication Hub—FIG. 3

FIG. 3 depicts an example of communication hubs 301, 303, and 305 according to the present invention, namely communication hub 400. Those skilled in the art will appreciate numerous variations that do not depart from the present invention. Those skilled in the art will also appreciate that various features described below could be combined with the above described embodiment to form multiple variations of the invention.

Figure 4:
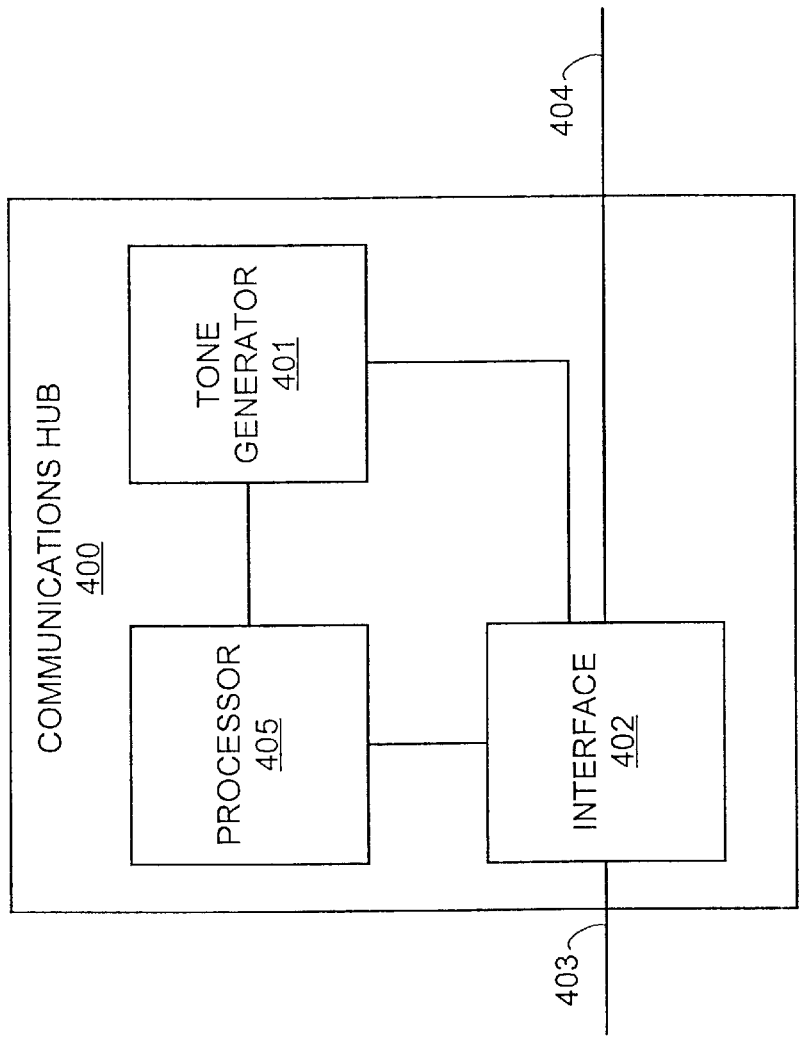
FIG. 4 illustrates an example of a communication hub according to the present invention.

Communication hub 400 is comprised of a processor 405, a tone generator 401, and an interface 402. Interface 402 is connected to processor 405, tone generator 401, and communication paths 403 and 404. Communication paths 403 and 404 could be conventional communication paths. Processor 405 is also connected to tone generator 401. Those skilled in the art will appreciate that in some embodiments of the invention tone generator 401 and interface 402 could be a part of processor 405, such as where tone generator 401 and interface 402 are in the same processing circuitry or included on the same chip as processor 405. Those skilled in the art will also understand that communication hub 400 would include other conventional components not shown on FIG. 4 for clarity, depending on the type of device and its operation in a network environment.

Processor 405 could be any processor capable of processing various messages to: 1) generate the continuity acknowledgment message, 2) direct tone generator 401 to provide the call tones to a call device, 3) direct tone generator 401 to stop providing call tones to the call device, 4) direct tone generator 401 to provide continuity test tones, and 5) generate a request for a continuity acknowledgment message from another communication hub. Tone generator 401 could be a conventional device that provides tones under the control of processor 405.

Interface 402 could be any interface that receives messages for processor 405 and transmits messages for processor 405. Interface 402 could also be a voice interface that acts as a POTS interface or packet interface, supervises messages, channels voice communications, or resolves contention between voice lines or voice communication paths. Interface 402 could also be a data or video interface that manages data stream, video stream, performs asynchronous time division, or concentrates data and video lines or paths. One example of interface 402 includes without limitation an asynchronous transfer mode (ATM) interface capable of handling ATM messaging for processor 405 over communication path 404 and capable of handling analog signaling for processor 405 over communication path. Interface 402 could handle numerous such communication paths although only communication paths 403 and 404 are shown for clarity.

Operation FIGS. 5–12.

Figure 1:
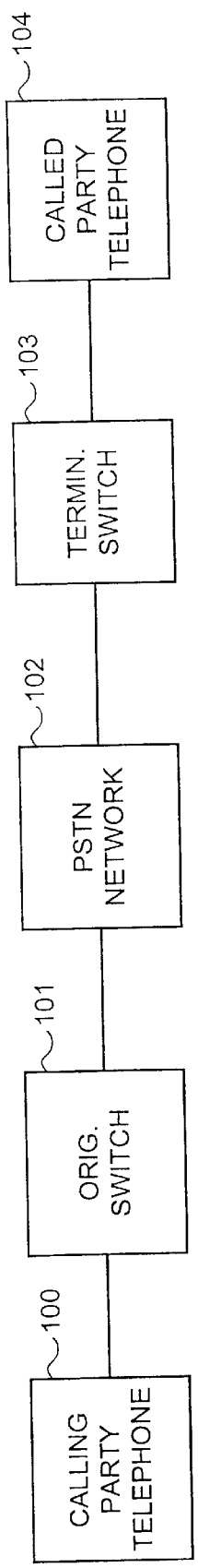
FIG. 1 illustrates an example of a prior art communication network.
Figure 2:
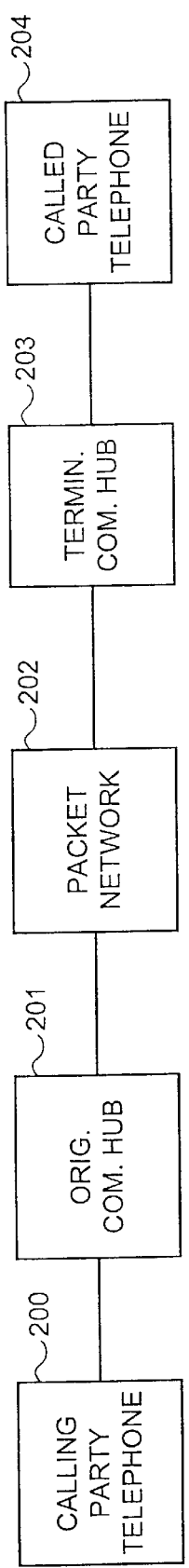
FIG. 2 illustrates another example of a prior art communication network
Figure 5:
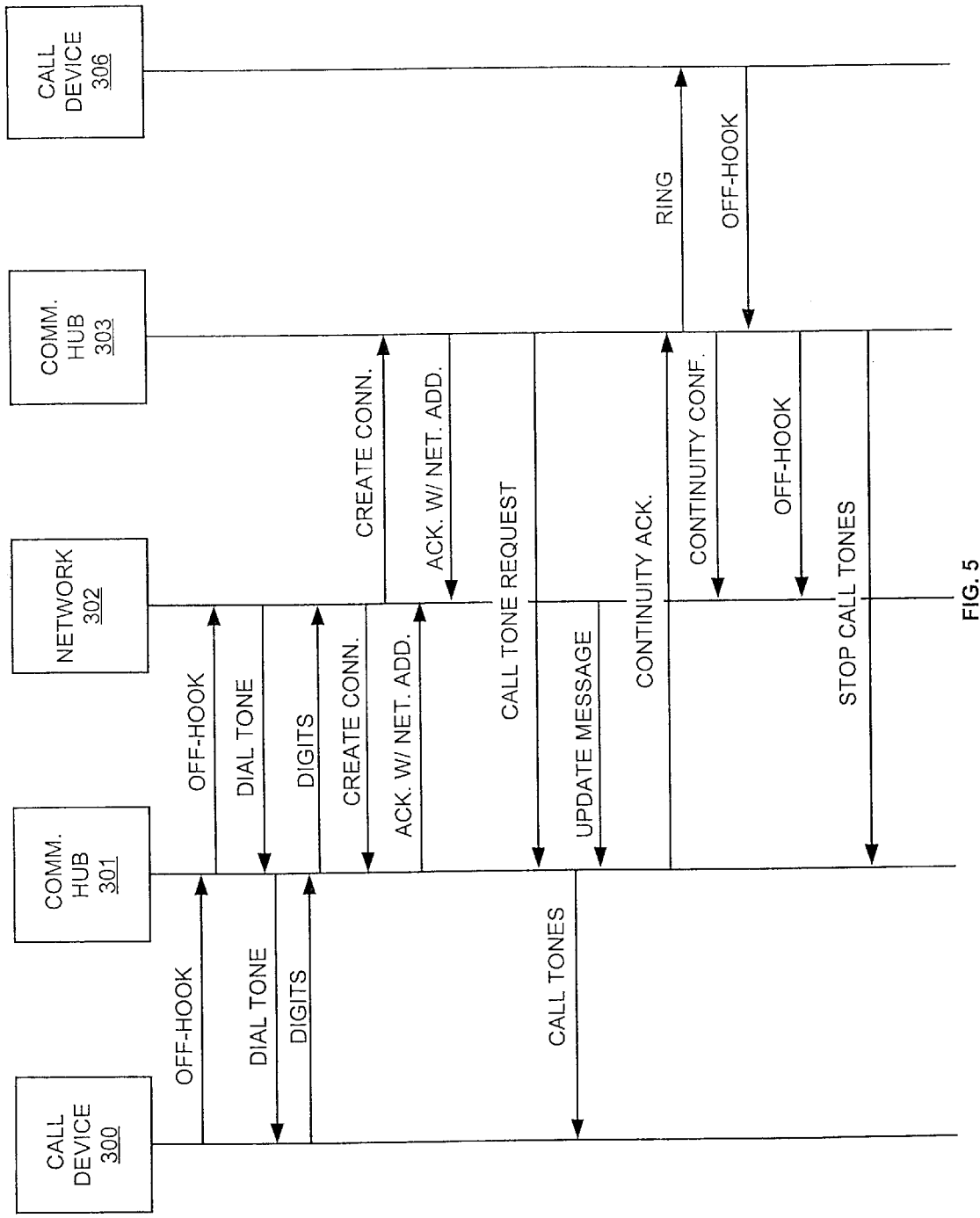
FIGS. 5 and 6 are a message sequence chart illustrating an example of an on-network call session according to the present invention.

FIGS. 5–2 are message sequence charts illustrating various examples of the operation of a communication hub according to the present invention. It is anticipated, however, that various modifications to these examples will readily apparent to those skilled in the art The principles defined herein may also be applied to other embodiments without the use of inventive faculty. Thus, the present invention is not intended to be limited to the examples shown below but is to be accorded the widest scope consistent with the principles and novel features disclosed herein.

Figure 6:
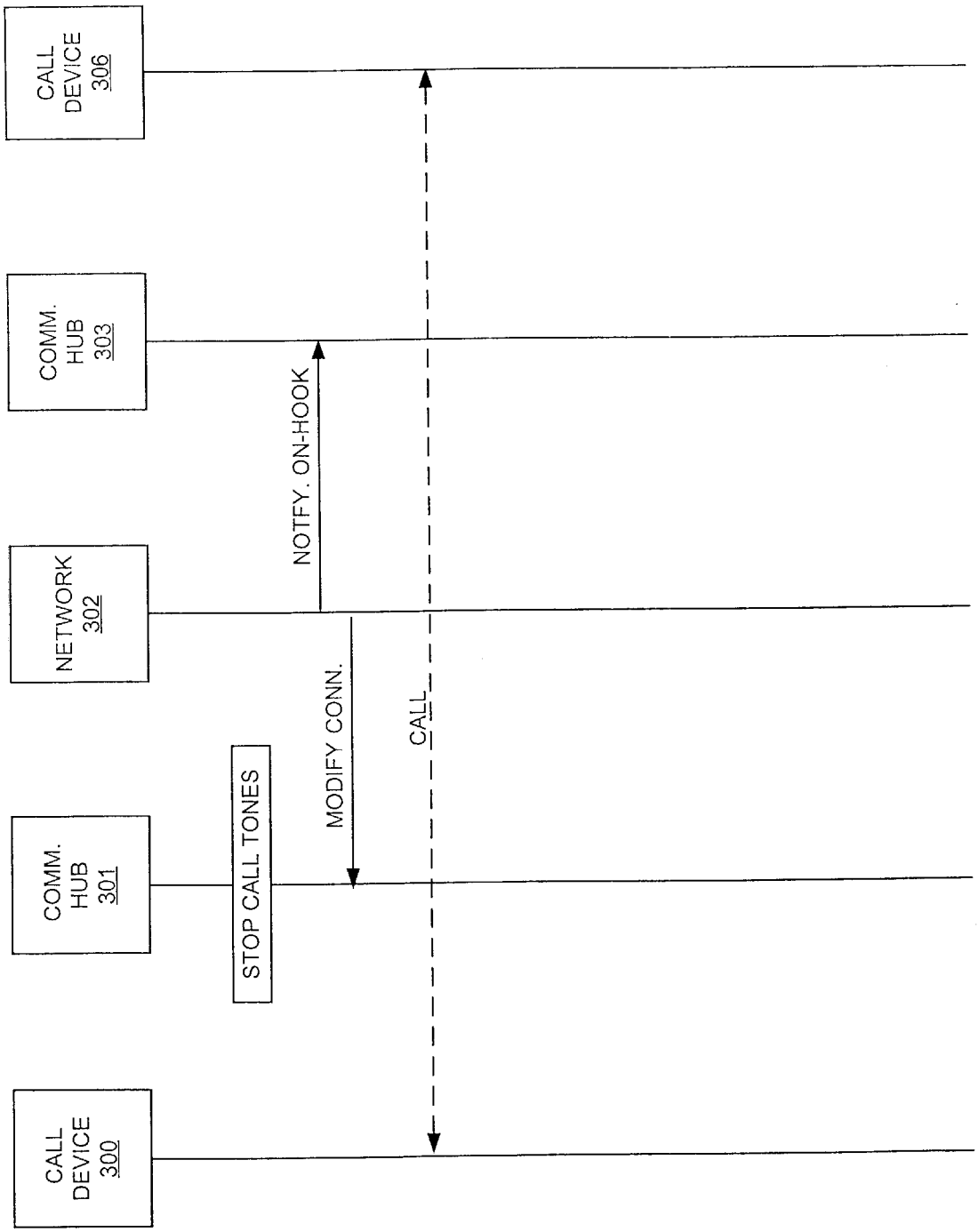

FIGS. 5–6 are a message sequence chart illustrating an example according to the present invention of an on-network call session between communication hubs 301 and 303. In this example continuity testing is accomplished by exchanging call tone request and continuity acknowledgment messages over the bearer channel. On FIGS. 5 and 6 call device 300 goes off-hook and an off-hook event is detected in communication hub 301. Communication hub 301 provides an off-hook message to communication network 302. Responsive to receiving the off-hook message, communication network. 302 provides a dial tone to call device 300 via communication hub 301. Caller entered digits are transmitted from call device 300 to communication network 302 via communication hub 301. Responsive to receiving the digits, communication network 302 provides a create connection message to communication hub 301. The create connection message to communication hub 301 creates a half duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 303. The create connection message to communication hub 303 creates a full duplex bearer connection between network 302 and communication hub 303. Responsive to the connection setup, communication hub 303 provides an acknowledgment message to communication network 302. The acknowledgment message includes the network address of communication hub 303. The create connection message to communication hub 303 includes the address of communication hub 301 and includes a request continuity test instruction. Responsive to receiving the request continuity test instruction, communication hub 303 provides an in-band call tone request message to communication hub 301 that includes a request to provide call tones to call device 300. In this case the call tones are ringback tones.

Responsive to receiving the call tone request message, communication hub 301 provides the call tones to call device 300. Substantially concurrently, communication network 302 provides an update message to communication hub 301 that includes the address of communication hub 303. Responsive to the update message, communication hub 301 provides a continuity acknowledgment message to communication hub 303. Advantageously, the call tone request message and the continuity acknowledgment message are provided over the bearer channel. Thus, if the continuity acknowledgment message is received in communication hub 303, bearer channel connectivity is confirmed.

Responsive to receiving the continuity acknowledgment message, communication hub 303 rings call device 306 to announce the incoming call. Communication hub 303 also provides a continuity confirmation message to communication network 302 to confirm receipt of the continuity acknowledgment message. It should be noted that in some examples of the present invention, communication network 302 starts an internal timer responsive to sending the request continuity test instruction to communication hub 303. If the internal timer times-out and the continuity confirmation message is not received, the continuity test has failed and communication network .302 clears the call. In other examples of the present invention, communication hub 303 could send an error message to communication network 302 if the continuity acknowledgment message is not received. Responsive to receiving the error message, communication network 302 clears the call.

Responsive to receiving an off-hook message from call device 306, communication hub 303 provides an off-hook message to communication network 302. Substantially concurrently, communication hub 303 provides a stop call tones message to communication hub 301. Communication hub 301, responsive to receiving the stop call tones message, stops providing the call tones to call device 300. Responsive to receiving the off-hook message, communication network 302 provides a request for on-hook notification message to communication hub 303 and modifies the connection between network 302 and communication hub 301 to a full duplex bearer connection to complete the call between call device 300 and call device 306.

Those skilled in the art will appreciate that the continuity test provided through the call tone messaging could be performed on all calls as described above. The continuity test could also be performed on a random unbiased basis for a certain percentage of calls based upon request from communication network 302. The request could be based on a frequency index established and adjusted based on the bearer network stability and availability. In examples where the continuity test is not requested, the continuity acknowledgment from communication hub 301 is optional. In this case communication hub 303 would ring call device 306 responsive to the time-out of an internal timer. It should be noted that the continuity acknowledgment message could also be used to confirm that the call tones are being provided by communication hub 301. In other examples of the invention, the call tone request message and continuity acknowledgment message could be retransmitted a pre-determined number of times at pre-determined intervals with duplicated received messages ignored.

Figure 7:
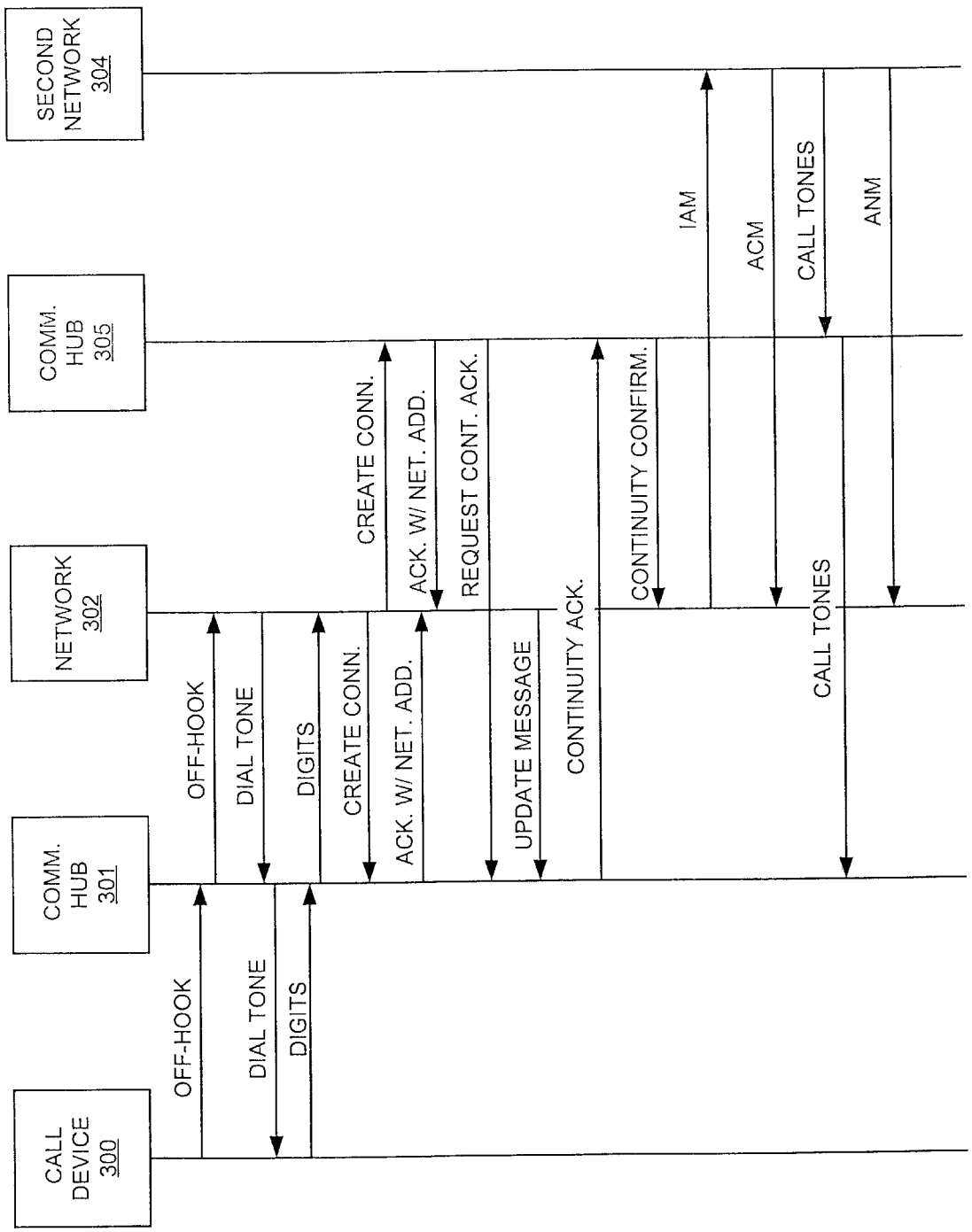
FIGS. 7 and 8 are a message sequence chart illustrating an example of an on-network to off-network call session according to the present invention.
Figure 8:
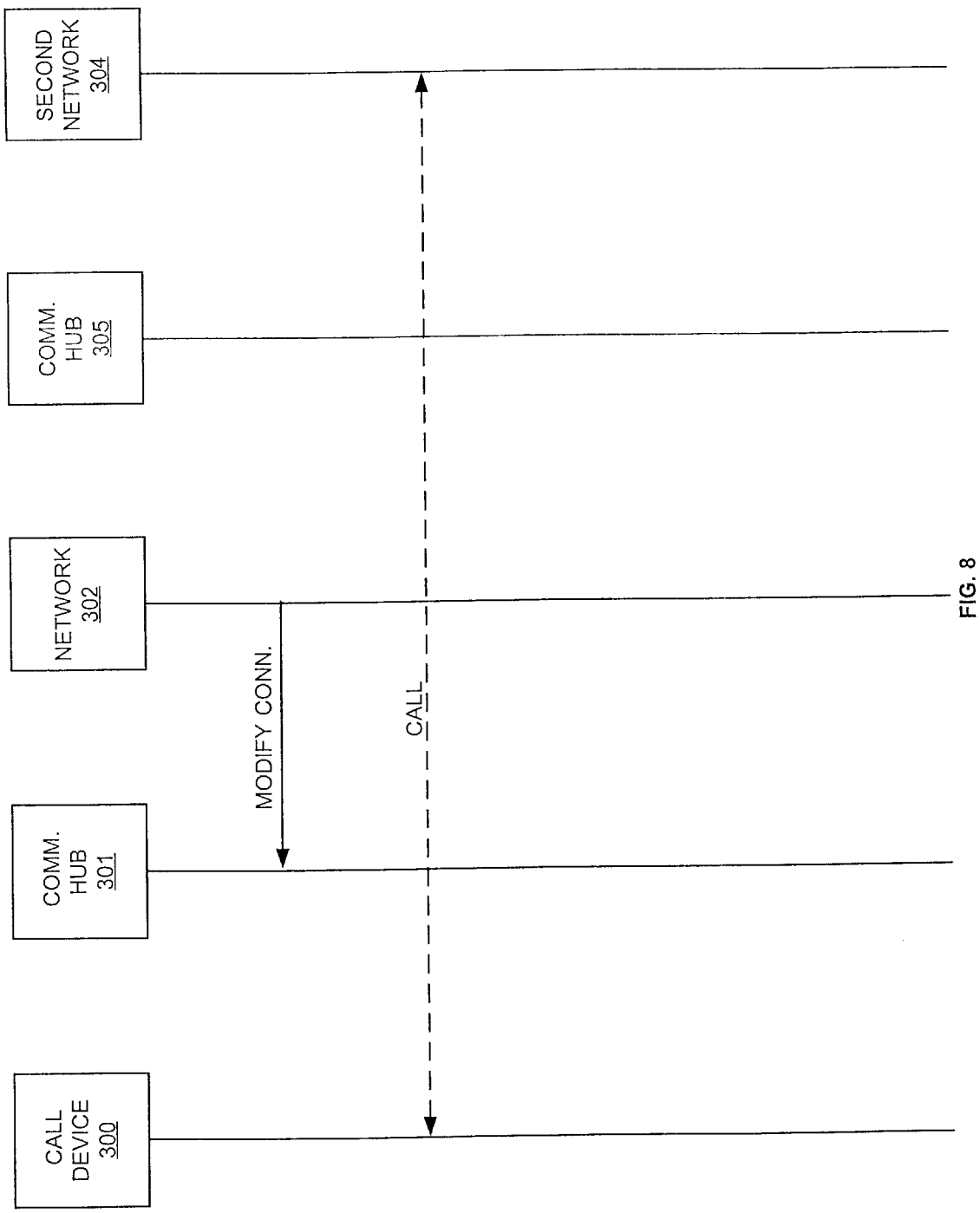

FIGS. 7 and 8 are a message sequence chart illustrating an example according to the present invention of an on-network to off-network call session between communication hubs 301 and 305. Those skilled in the art will appreciate that in this example communication network 302 performs a separate continuity test of the bearer channel as the call tones are provided by second network 304. On FIGS. 7 and 8 call device 300 goes off-hook and an off-hook event is detected in communication hub 301. Communication hub 301 provides an off-hook message to communication network 302. Responsive to receiving the off-hook message, communication network 302 provides a dial tone to call device 300 via communication hub 301. Caller entered digits are transmitted from call device 300 to communication network 302 via communication hub 301. Responsive to receiving the digits, communication network 302 provides a create connection message to communication hub 301. The create connection, message to communication hub 301 creates a half duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 305. The create connection message to communication hub 305 creates a full duplex bearer connection between network 302 and communication hub 305. Responsive to the connection setup, communication hub 305 provides an acknowledgment message to communication network 302. The acknowledgment message includes the network address of communication hub 305. The create connection message to communication hub 305 includes the address of communication hub 301 and includes a request continuity test instruction. Substantially concurrently with the create connection message for the full duplex bearer connection, communication network 302 provides an update message to communication hub 301 that includes the network address of communication hub 305. Responsive to the continuity test request message, communication hub 305 provides a request for continuity acknowledgment message to communication hub 301. Responsive to the request for continuity acknowledgment message, communication hub 301 provides a continuity acknowledgment message to communication hub 305. Advantageously, the request for continuity acknowledgment and the continuity acknowledgment message are provided over the bearer channel, thus ensuring the bearer channel connectivity prior to call completion. Responsive to receiving the continuity acknowledgment message, communication hub 305 provides a continuity confirmation message to communication network 302 confirming the continuity acknowledgment message was received.

Substantially concurrently, to receiving the confirmation message, communication network 302 provides an IAM message to second communication network 304. Responsive to processing the IAM message, second communication network 304 provides an ACM message to communication network 302. Second communication network 304 also provides call tones to call device 300 via communication hub 305. Responsive to the called device (not shown) going off-hook, second communication network 304 provides an answer (ANM) message to communication network 302. Responsive to receiving the ANM message, communication network, 302 modifies the half duplex connection between communication hub 301 and communication network 302 to a full duplex bearer connection to complete the call.

Figure 9:
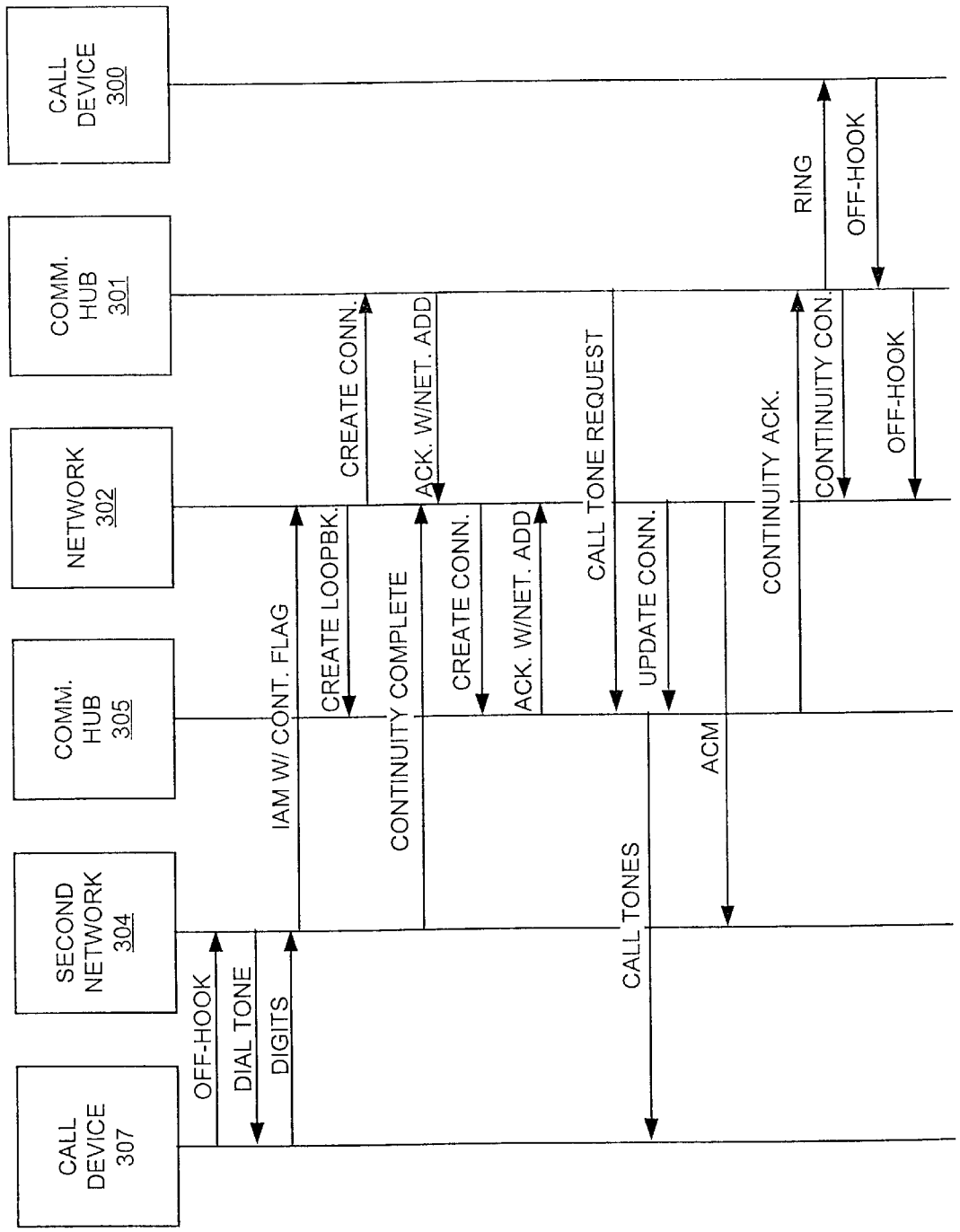
FIGS. 9 and 10 are a message sequence chart illustrating an example of an off-network toy on-network call session according to the present invention.
Figure 10:
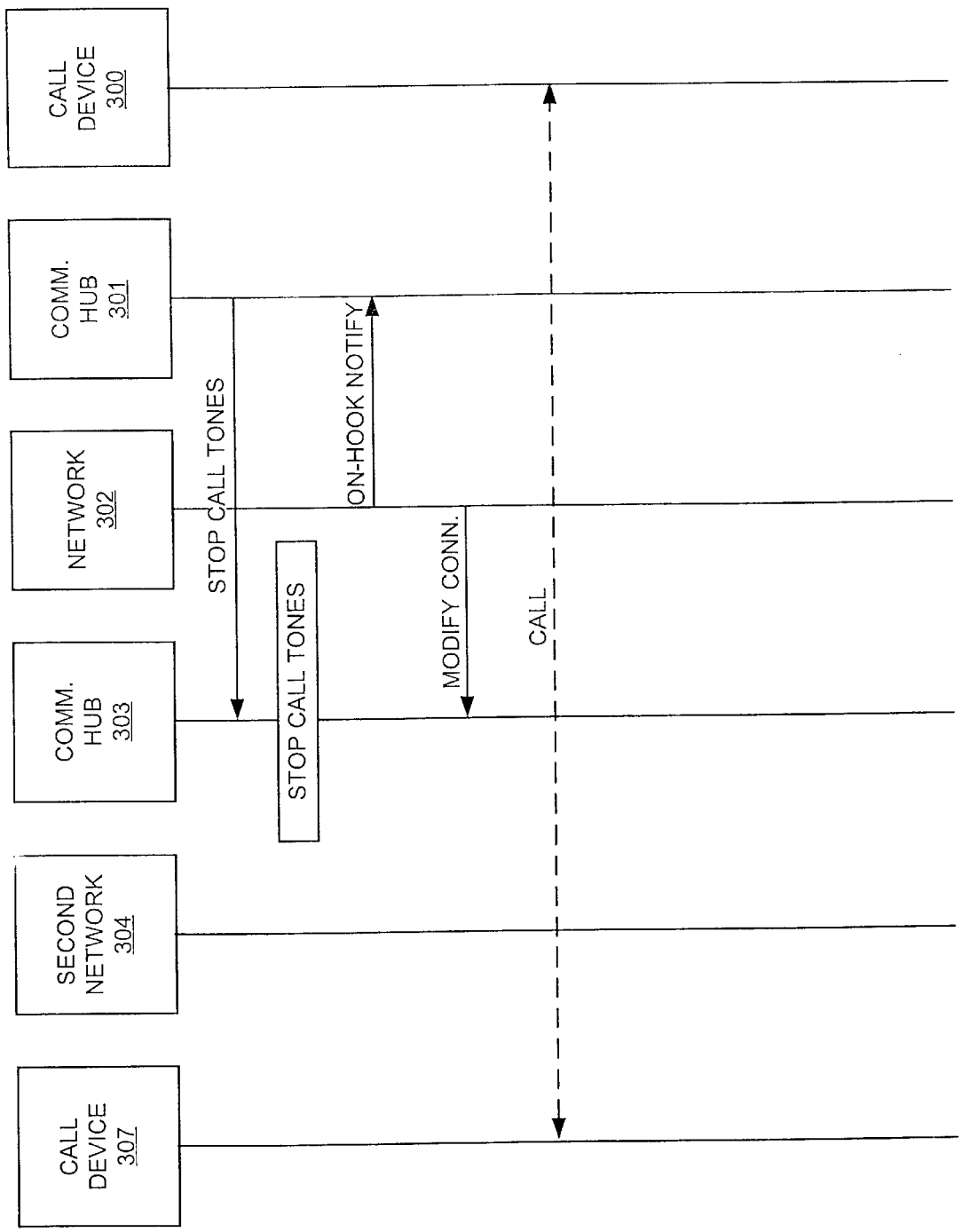

FIGS. 9 and 10 are a message sequence chart illustrating an example according to the present invention of an off-network to on-network call session between communication hubs 301 and 305. In this example continuity testing is accomplished by exchanging call tone request and continuity acknowledgment messages over the bearer channel. On FIGS. 9 and 10 call device 307 goes off-hook. Second communication network 304 detects the off-hook event and provides a dial tone to call device 307. Responsive to receipt of caller entered digits, second communication network 304 provides an IAM message to communication network 302 via communication hub 305. The IAM message includes a continuity test flag that indicates to communication network 302 that a continuity test is being performed in second communication network 304. Responsive to receiving the IAM message, communication network 302 provides a create loopback message to communication hub 305. The create loopback message provides communication hub 305 with loopback instructions for the continuity test tone. Second communication network 304 performs the continuity test. The continuity test comprises transmitting test tones over the bearer channel and waiting for the loopback of the tone by communication hub 305. Responsive to receiving the continuity test tones back, second communication network 304 provides a continuity test message to communication network 302 to indicate a successful test. Responsive to the continuity test message, communication network 302 provides a create connection message to communication hub 301. The create connection message to communication hub 301 creates a full duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 305. The create connection message to communication hub 305 creates a half duplex bearer connection between network 302 and communication hub 305. Responsive to the connection setup, communication hub 305 provides an acknowledgment message to, communication network 302.

The acknowledgment message includes the network address of communication hub 305. The create connection message for the full duplex bearer connection includes the network address of communication hub 305 and includes the continuity test request instruction. Responsive to the continuity test request instruction, communication hub 301 provides a call tone request message to communication hub 305 with the request for communication hub 303 to provide call tones to call device 307. Responsive to the call tone request message, communication hub 301 provides the call tones to call device 307.

Substantially concurrently, communication network 302 updates communication hub 305 with the address of communication hub 301 and provides an ACM message to second communication network 304. Responsive to providing the call tones to call device 307, communication hub 305 provides a continuity acknowledgment message to communication hub 301. Responsive to receiving the continuity acknowledgment message, communication hub 301 rings call device 300 to announce the incoming call. Communication hub. 301 also provides a continuity confirmation message to communication network 302 to confirm the bearer channel connectivity. Responsive to receiving an off-hook message from call device 300, communication hub 301 provides an off-hook message to communication network 302. Substantially concurrently communication hub 301 provides a stop call tones message to communication hub 305. Communication hub 305, responsive to receiving the stop call tones message, stops providing the call tones to call device 307. Communication network 302 sends a request for on-hook notification message to communication hub 301 and modifies the connection between communication network 302 and communication hub 305 to a full duplex bearer connection to complete the call between call device 307 and call device 300.

Figure 11:
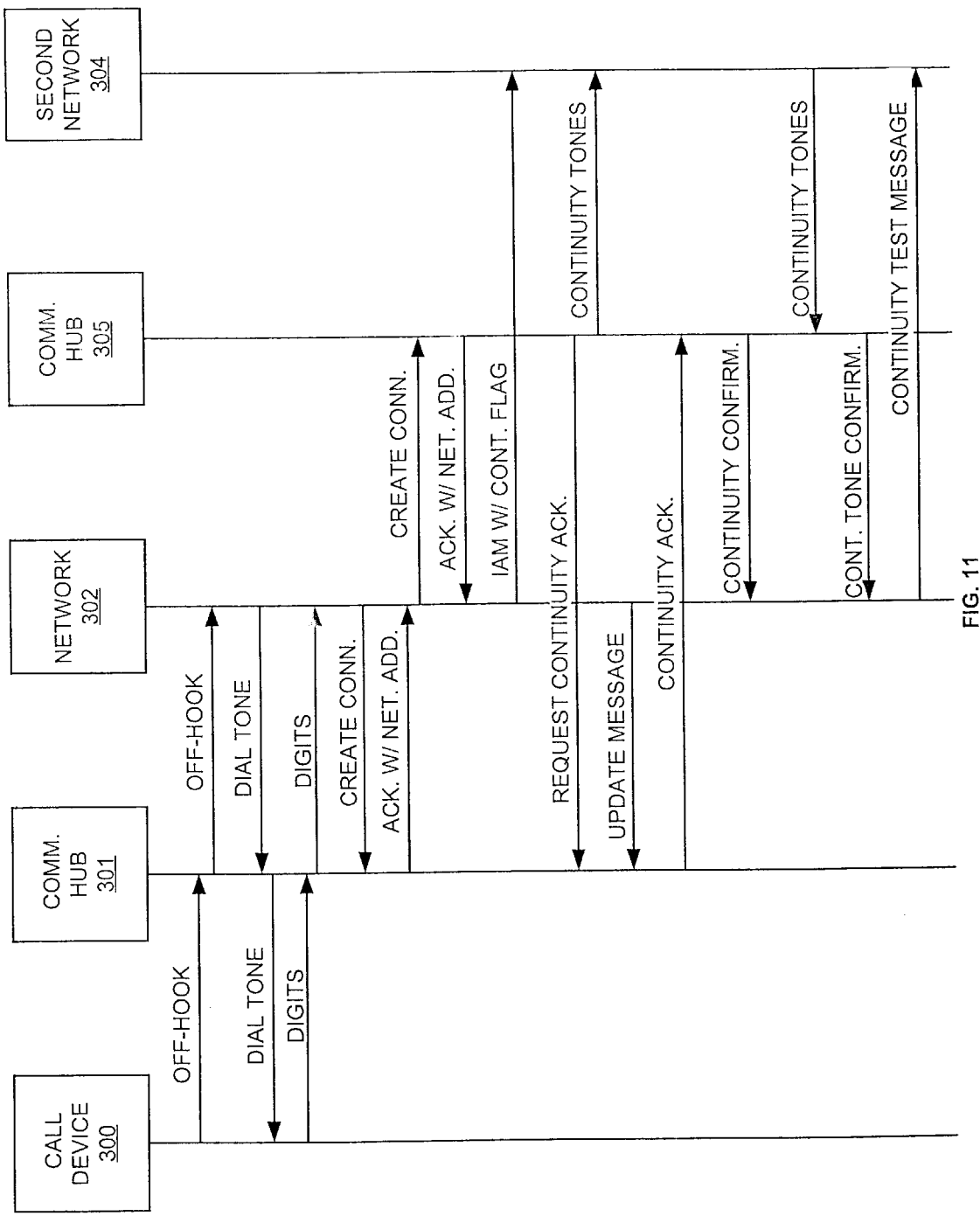
FIGS. 11 and 12 are a message sequence chart illustrating another example of an on-network to off-network call session according to the present invention.
Figure 12:
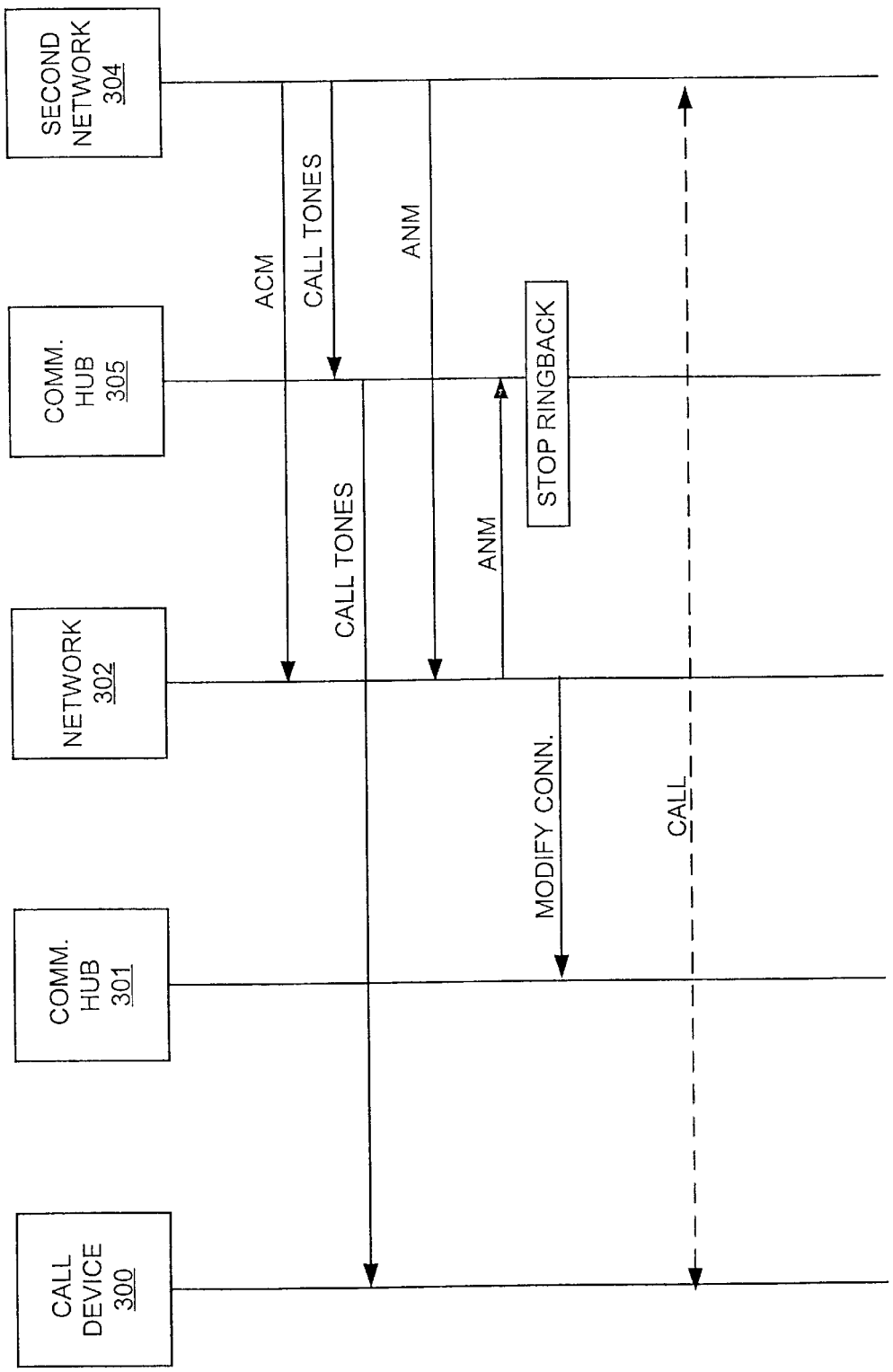

FIGS. 11 and 12 are a message sequence chart illustrating an example of an on-network to off-network call session where the continuity test is performed in communication network 302 and in second communication network 304 by a communication hub according the present invention. Those skilled in the art will appreciate that in this example communication network 302 performs a separate continuity test of the bearer channel in communication network 302 as the call tones are provided by second network 304. On FIGS. 11 and 12 call device 300 goes off-hook and an off-hook event is detected in communication hub 301. Communication hub 301 provides an off-hook message to communication network 302. Responsive to receiving the off-hook message, communication network 302 provides a dial tone to call device 300 via communication hub 301. Caller entered digits are transmitted from call device 300 to communication network 302 via communication hub 301. Responsive to receiving the digits, communication network 302 provides a create connection message to communication hub 301. The create connection message to communication hub 301 creates a half duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 305. The create connection message to communication hub 305 creates a full duplex bearer connection between network 302 and communication hub 305. Responsive to the connection setup, communication hub 305 provides an acknowledgment message to communication network 302. The acknowledgment message includes the network address of communication hub 305. The create connection message for the full duplex bearer connection includes the network address of communication hub 301, includes a request continuity test instruction with the request for communication hub 305 to perform a continuity test of the bearer channel in communication network 302, and includes a request continuity test tone instruction with a request for communication hub 305 to perform a continuity test of the bearer channel in second communication network 304. Communication network 302 also provides an IAM message to second communication network 304. The IAM includes a continuity test flag to inform second communication network 304 that a continuity test will be performed before the call is completed. Responsive to the continuity test instructions, communication hub 305 provides a request for continuity acknowledgment message to communication hub 301. Communication hub 305 also provides continuity test tones to second communication network 304. Communication network 302 provides an update message to communication hub 301 that includes the network address of communication hub 305. Responsive to receiving the request for the continuity acknowledgment, communication hub 301 provides a continuity acknowledgment message to communication hub 305. Responsive to receiving the continuity acknowledgment message, communication hub 305 provides a confirmation message to communication network 302 confirming the bearer channel connectivity in communication network 302. Second communication network 304 process the continuity test tones by looping the tones back to communication hub 305. Responsive to receiving the continuity test tones back from second communication network 304, communication hub 305 provides a continuity test tone confirmation message to communication network 302 confirming receipt of the continuity tones and the bearer channel connectivity in second communication network 304. Responsive to receiving the continuity test tone confirmation message, communication network 302 provides a continuity test message to second communication network 304 to indicate the continuity test success. Responsive to the continuity test message, second communication network 304 provides an ACM message to communication network 302. Call tones are provided by second communication network 304 via communication hub 305 to call device 300. Responsive to receiving an ANM message from second communication network 304, communication network 302 modifies the connection between communication network 302 and communication hub 301 to a full duplex bearer connection to complete the call.

The continuity test in second communication network 304 could be performed on all calls. The continuity test in second communication network 304 could also be performed on a random unbiased basis for a certain percentage of calls based upon request from communication network 302. The request could be based on a frequency index established and adjusted based on the bearer network stability and availability. In some examples of the invention, the request continuity test message, the continuity acknowledgment message, and the continuity tones could be retransmitted a pre-determined number of times at pre-determined intervals with duplicated received messages ignored.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

We claim:

1. A communication hub comprising:

a tone generator configured to generate call tones;

a processor coupled to the tone generator and configured to process an in-band call tone request message to generate an in-band continuity acknowledgment message and to direct the tone generator to provide the call tones to a call device; and an interface coupled to the processor and the tone generator and configured to receive the call tone request message and transmit the continuity acknowledgment message and the call tones.

2. The communication hub of claim 1 wherein the processor is farther configured to process a stop call tone message to stop providing the call tones to the call device and the interface is further configured to receive the stop call tone message for the processor.

3. The communication hub of claim 1 wherein the processor is further configured to process a request continuity test instruction to generate a second in-band call tone request message for another communication hub, and the interface is further configured to receive the request continuity test instruction and transmit the second call tone request message for the processor.

4. The communication hub of claim 3 wherein the processor is further configured to process a second continuity acknowledgment message from the other communication hub to generate a continuity confirmation message, and the interface is further configured to receive the second continuity acknowledgment message and transmit the continuity confirmation message for the processor.

5. The communication hub of claim 4 wherein the processor is further configured to process the second continuity acknowledgment message from the other communication hub to ring the call device.

6. The communication hub of claim 5 wherein the continuity acknowledgment message and second continuity acknowledgment message are provided in-band.

7. The communication hub of claim 5 wherein the processor is further configured to process a request continuity test tone instruction to direct the tone generator to provide continuity test tones and the interface is further configured to receive the request continuity test tone instruction and transmit the continuity test tones for the processor.

8. The communication hub of claim 7 wherein the processor is further configured to process the continuity test tones to generate a continuity test tone confirmation message and the interface is further configured to receive the continuity test tones and transmit the continuity test tone confirmation message for the processor.

9. The communication hub of claim 5 wherein the communication hub is a switch.

10. The communication hub of claim 5 wherein the communication hub is a residential communication hub.

11. The communication hub of claim 5 wherein the communication hub is a voice gateway.

12. A method of operating a communication hub the method comprising:

receiving an in-band call tone request message that includes a request to provide call tones to a call device;

processing the call tone request message to generate a continuity acknowledgment message;

transmitting the continuity acknowledgment message in-band; and providing the call tones to the call device.

13. The method of claim 12 further comprising:

receiving a stop call tone message; and processing the stop call tone message to stop providing the call tones to the call device.

14. The method of claim 12 further comprising:

receiving a request continuity test message that includes a request for a continuity test;

processing the request continuity test message to generate a second call tone request message for another communication hub; and transmitting the second call tone request message in-band.

15. The method of claim 14 further comprising:

receiving a second continuity acknowledgment message from the other communication hub;

processing the second continuity acknowledgment to generate a continuity confirmation message; and transmitting the continuity confirmation message.

16. The method of claim 15 further comprising:

processing the second continuity acknowledgment message from the other communication hub to ring the call device.

17. The method of claim 15 wherein the continuity acknowledgment message and the second continuity acknowledgment message are provided in-band.

18. The method of claim 15 further comprising:

receiving a request continuity test tone message;

processing the request continuity test tone message to generate continuity test tones; and transmitting the continuity test tones.

19. The method of claim 18 further comprising:

receiving the continuity test tones;

processing the continuity test tones to generate a continuity test tone confirmation message; and transmitting the continuity test tone confirmation message.

20. The method of claim 15 wherein the communication hub is a switch.

21. The method of claim 15 wherein the communication hub is a residential communication hub.

22. The method of claim 5 wherein the communication hub is a voice gateway.

23. A communication system comprising:

a first communication hub connected to a communication network;

a second communication hub connected to the communication network, wherein the communication network is configured to provide a request continuity test instruction to the second communication hub and the second communication hub is configured to process the request continuity test instruction to generate and transmit an in-band call tone request message to the first communication hub.

24. The communication system of claim 23 wherein the first communication hub is configured to process the call tone request message to generate and transmit a continuity acknowledgment message for the second communication hub and provide call tones to a call device.

25. The communication system of claim 24 wherein the second communication hub is further configured to process the continuity acknowledgment message to provide a continuity confirmation message to the communication network.

26. The communication system of claim 24 wherein the second communication hub is farther configured to process the continuity acknowledgment message to ring a second call device.

27. The communication system of claim 24 wherein the second communication hub is further configured to process a request continuity test tone instruction to provide continuity test tones to a second communication network.

28. The communication system of claim 27 wherein the second communication hub is further configured to process the continuity test tones to provide a continuity test tone confirmation message to the communication network that includes a confirmation that the continuity test tones were received back form the second communication network.

29. The communication system of claim 28 wherein at least one of the first communication hub and the second communication hub is a switch.

30. The communication system of claim 28 wherein at least one of the first communication hub and the second communication hub is a residential communication hit.

31. The communication system of claim 28 wherein at least one of the first communication hub and the second communication hub is a voice gateway.

32. The communication system of claim 28 wherein the communication network is a packet network.

33. A method of operating a communication system the method comprising receiving a request continuity test message in a second communication hub that includes a request for a continuity test;

processing the request continuity test message to generate a call tone request message; and providing the call tone request message to a first communication hub in-band.

34. The method of claim 33 further comprising:

processing the call tone request message in the first communication hub to generate a continuity acknowledgment message and call tones;

providing the call tones to a call device; and providing the continuity acknowledgment message to the second communication hub.

35. The method of claim 33 further comprising:

processing the continuity acknowledgment message in the second communication hub to generate a continuity confirmation message that includes a confirmation that the continuity acknowledgment message was received; and transmitting the continuity acknowledgment message.

36. The method of claim 33 further comprising:

processing the continuity acknowledgment message in the second communication hub to ring a call device.

37. The method of claim 33 further comprising:

process a request continuity test tone message in the second communication hub to generate continuity test tones; and transmit the continuity test tones.

38. The method of claim 37 further comprising:

receiving the continuity test tones in the second communication hub;

processing the continuity test tones in the second communication hub to generate a continuity test tone confirmation message;

transmitting the continuity test tone confirmation message.

39. The method of claim 37 wherein at least one of the first communication hub and the second communication hub is a switch.

40. The method of claim 37 wherein at least one of the first communication hub and the second communication hub is a residential communication hub.

41. The method of claim 37 wherein at least one of the first communication hub and the second communication hub is a voice gateway.

42. The method of claim 37 wherein the communication network is a network.

* * * * *